Feb. 11, 1930.  J. H. ASHBAUGH  1,746,757
LOAD BALANCING REGULATOR SYSTEM
Filed Dec. 9, 1927

INVENTOR
John H. Ashbaugh.
BY
ATTORNEY

Patented Feb. 11, 1930

1,746,757

UNITED STATES PATENT OFFICE

JOHN H. ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA

LOAD-BALANCING REGULATOR SYSTEM

Application filed December 9, 1927. Serial No. 238,809.

My invention relates to regulator systems for balancing the load between direct-current dynamo-electric machines.

In certain applications, such, for example, as the operation of generators connected in parallel-circuit relation, it is necessary to compensate the generators for temperature variations of the field windings.

When a generator is started and connected to the station bus in parallel with other generators which have previously been in operation, the newly started machine, being cold, will not take its share of the load with a setting of the field rheostat corresponding to that of the other machines. If the field rheostat of the newly started machine is set to give a voltage that will produce the desired division of load between the machines, while the machine is cold, this machine will reduce its load as it heats up because of the increasing resistance of the field winding upon an increase of the temperature thereof.

An object of my invention is to provide a regulator system that will maintain a desired load balance between a plurality of dynamo-electric machines operating in parallel-circuit relation.

In a regulator system constructed in accordance with my invention, a regulator is provided for each of the several machines operating in parallel, and the regulator is so actuated as to control the field-winding circuit of its associated machine to maintain the field current, or the armature current, of the machine in a desired relation to that of the current of the other machines.

Figure 1:
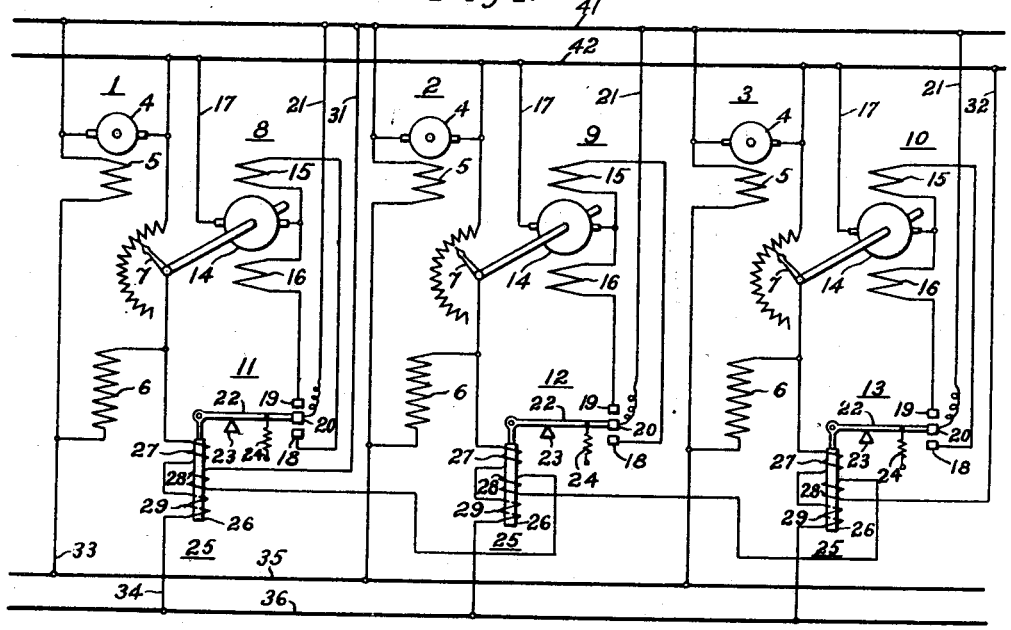
Figure 1, is a diagrammatic view of circuits and apparatus arranged in accordance with my invention wherein the regulator system operates to maintain a fixed relation between the currents traversing the field-winding circuits of the several machines.

Referring to the form of the invention illustrated in Fig. 1 of the drawing, three direction-current generators 1, 2 and 3 are illustrated, each having similar armature and field windings 4 and 5, respectively. The armature windings of the several machines are connected, in parallel-circuit relation, to the station buses 41 and 42. Each field winding 5 is connected in series-circuit relation to a resistor 6 and a field-regulating rheostat 7.

The field rheostats 7 for governing the voltage of the generators 1, 2 and 3, are actuated by pilot motors 8, 9 and 10, which are controlled by regulating relays 11, 12 and 13, respectively. Each of the pilot motors 8, 9 and 10 is illustrated as being provided with an armature winding 14 and split series field windings 15 and 16. The circuit of the pilot motor is traced from the bus bar 42, through conductor 17, armature winding 14, one of the field windings 15 or 16, one of two fixed regulator contact members 18 or 19, through a movable regulator contact member 20, and conductor 21, to the other bus bar 41.

Each of the regulators 11, 12 and 13 comprises two fixed contact members 18 and 19 and a movable contact member 20. The contact member 20 is carried by the lever 22, which is mounted upon the pivot 23, and to which is attached a biasing member 24 and a core 26 of an electromagnet 25. The spring or biasing member 24 normally balances the moving parts of the regulators so that the movable contact member 20 remains in the illustrated or non-contact making position when the electromagnet 25 is unenergized. The electromagnet 25 comprises, in addition to the moving core or armature member 26, three windings 27, 28 and 29. The windings 27 and 29 are differentially related and are connected in series-circuit relation. The three coils 27, 28 and 29 are symmetrically positioned with respect to the center of the core 26 when the relay is in its central, or illustrated, position. The coils 28 of the several relays 11, 12 and 13 are connected in series-circuit relation, to the bus bars 41 and 42 by means of conductors 31 and 32 and are for the purpose of polarizing the core of the relays. The resistors 6, in the field winding circuits of the several generators 1, 2 and 3, are connected, through the differentially related windings 27 and 29 of the associated relays and by means of conductors 33 and 34, to dummy bus bars 35 and 36.

The operation of the regulator is as follows: Each resistor 6, in the field-winding circuit of generators 1, 2 and 3, is connected to the dummy bus bars 35 and 36 and applies thereto a voltage equal to the IR drop across the resistor, which is a measure of the current flowing in the field circuit of the generator. If the voltage drops across the several resistors correspond, the voltages applied to the dummy bus bars from the several resistors 6 will be equal and there will be no current flow through the windings 27 and 29 of the several regulating relays. If the generator 1, for example, is taking less than its proper share of the load, the voltage across the resistors 6 in the field circuit of that machine, caused by the current through the field winding thereof, will be less than the voltage applied to the dummy bus bars 35 and 36 by the voltage drop across the resistors 6 in the field circuits of the other machines. Consequently, current will flow from the dummy bus bars 35, 36, through the resistor 6 in the field winding circuit of the generator 1, energizing the windings 27 and 29 of the relay 11 in a given direction. The relay 11 is then actuated in one direction to cause the movable contact member 20 to engage one of the fixed contact members 18 or 19 to complete the circuit through the pilot motor 8 and cause it to operate in a direction to decrease the resistance of the generator-field-winding circuit, thereby increasing the current therethrough and the load on the generator 1.

If the generator 1 is taking less than its desired load, current will flow from the resistor 6 in the field winding of this machine to the dummy bus bars 35 and 36, or, through the coils 27 and 29 of the regulating relay 11 in the opposite direction. The relay 11 will, therefore, be actuated in the opposite direction to cause the movable contact member 20 to engage the other of the fixed contact members 18 and 19, and effect operation of the pilot motor 8 and the field rheostat 7 in the opposite direction to thereby decrease the load on the generator 1.

As soon as the pilot motor 8 has been operated sufficiently to equalize the load on the generator 1, current will cease to flow through the windings 27 and 29 of the relay 11 and it will again assume its open-circuit position. If current flows from the resistor 6 in circuit with the field winding of the generator 1 to the dummy bus bars 35 and 36, it will flow through the relay coils 27 and 29 of the relay 11 in one direction, and portions of this current will flow through the coils 27 and 29 of the relays 12 and 13 in the opposite direction, completing its circuit through the resistors 6 in the field-winding circuits of the generators 2 and 3.

As the regulating relay 11 is operated to increase or decrease the load on the generator 1, the relays 12 and 13 are operated to vary the loads on the generators 2 and 3 in the opposite direction. It is apparent, therefore, that a variation of the load of any of the several machines operating in parallel will affect the regulators governing the several machines.

In order for the regulating system to be in balance, it is necessary that the voltage drops across the resistors 6 shall correspond. Should it be desired to operate each of the generators with the same field current, the three resistors 6 should have the same resistance value. If it is desirable to operate the several machines at any predetermined load ratio between the machines, it is only necessary to vary the value of the resistors 6 accordingly. Any one of a number of well known anti-hunting schemes may be used to prevent over-travel of the regulator systems.

Figure 2:
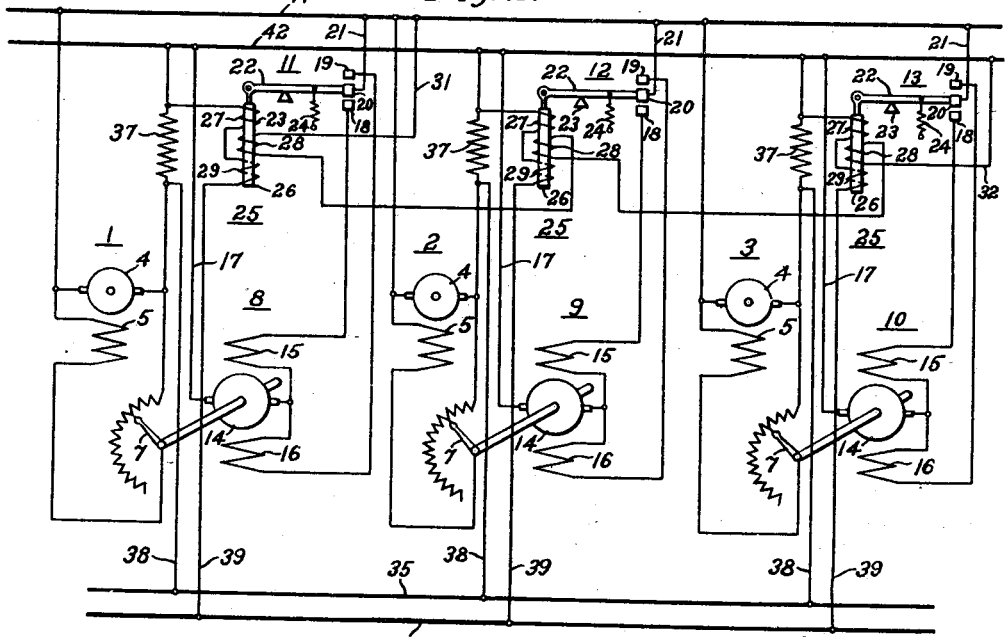
Fig. 2 is a diagrammatic view of circuits and apparatus illustrating a modification of my invention wherein the regulator system is operated by the currents traversing the armature circuits of the several machines.

The regulator system illustrated in Fig. 2 differs from that illustrated in Fig. 1 in that resistors 37, connected in the armature circuits of the generators 1, 2, and 3, are provided in place of the resistors 6. The several resistors 37 are each connected to the dummy bus bars 35 and 36 by pairs of conductors 38 and 39. The several regulators operate in the manner described in the system of Fig. 1, the regulators being sensitive to changes in the relation of armature currents of the machines rather than to the relation between the current values in the field-winding circuits of the machines.

While the regulator system has been described with particular reference to maintaining a desired load relation between a plurality of generators, it is obvious that the system may be utilized to maintain a desired load relation between a plurality of dynamo-electric machines operating as motors.

Since many modifications may be made in the circuits and apparatus illustrated without departing from the spirit of my invention, I do not wish it to be limited otherwise than by the scope of the appended claims.

I claim as my invention:

1. In a regulator system, a plurality of direct-current dynamo-electric machines, means for governing the field excitation of said several machines for maintaining a desired load relation between them, said means comprising an element associated with each machine for producing an electrical quantity proportional to the load on said machine, a circuit for connecting said several elements, and a regulator for each machine responsive to the direction of current flow in said circuit.

2. In a regulator system, a plurality of direct-current dynamo-electric machines, means for governing the field excitation of said several machines for maintaining a desired load relation between them, said means comprising an element associated with each machine for producing an electrical quantity proportional to the load on said machine, a pair of conductors to which said several elements are connected, and a regulator for each machine responsive to the direction of current flow between said conductors and the associated elements.

3. In a regulator system, a plurality of direct-current dynamo-electric machines, means for governing the field excitation of said several machines for maintaining a desired load relation, a resistor associated with each machine for producing a voltage proportional to the load on said machine, a pair of conductors to which said several resistors are connected, and a regulator for each machine responsive to the direction of current flow between said conductors and the associated resistor.

4. In a regulator system, a plurality of direct-current dynamo-electric machines, means associated with each machine for producing a voltage proportional to the load on said machine, a pair of conductors to which said several means are connected in parallel circuit relation, a regulator associated with each machine for controlling the excitation thereof, said regulator having a relay provided with a pair of differentially related windings connected between said conductors and said first named means.

In testimony whereof, I have hereunto subscribed my name this 3rd day of December, 1927.

JOHN H. ASHBAUGH.